US006840651B2

(12) United States Patent
Wu

(10) Patent No.: US 6,840,651 B2
(45) Date of Patent: Jan. 11, 2005

(54) LAMP ROD ASSEMBLY OF DETACHABLE CEILING LAMP

(76) Inventor: Wen-Chang Wu, No. 10, Lane 191, Hsi Hsin Street, Chuang Ya Tsun, Hsiu Shui Hsiang, Chang Hua Hsien (TW)

( * ) Notice: Subject to any disclaimer, the term of this patent is extended or adjusted under 35 U.S.C. 154(b) by 69 days.

(21) Appl. No.: 10/359,688

(22) Filed: Feb. 7, 2003

(65) Prior Publication Data

US 2004/0160780 A1 Aug. 19, 2004

(51) Int. Cl.[7] .................................................. H01R 33/00

(52) U.S. Cl. ....................... 362/226; 362/404; 362/405; 362/432

(58) Field of Search ................................ 362/226, 404, 362/405, 432, 457, 382, 410

(56) References Cited

U.S. PATENT DOCUMENTS 4,079,244 A * 3/1978 Bortoluzzi .................. 362/405
4,523,264 A * 6/1985 West .......................... 362/396
4,709,313 A * 11/1987 Goralnik ..................... 362/414
6,502,966 B1 * 1/2003 Wu ............................ 362/365
6,555,750 B2 * 4/2003 Kiely ....................... 174/65 R
6,575,605 B2 * 6/2003 Averbeck et al. ........... 362/431
6,612,531 B2 * 9/2003 Wu ............................ 248/317
6,692,140 B2 * 2/2004 Wu ............................ 362/370
2003/0099109 A1 * 5/2003 Wu ............................ 362/370
2004/0022062 A1 * 2/2004 Wu ............................ 362/405

* cited by examiner

*Primary Examiner*—Thomas M. Sehber
*Assistant Examiner*—Jacob Y. Choi
(74) *Attorney, Agent, or Firm*—Troxell Law Office PLLC

(57) ABSTRACT

A lamp rod assembly for detachable ceiling lamps having a lamp base fixed on a lateral side of a wire connection box, and a lamp rod inserted into the interior of the lamp base. A lamp base is secured to a position on the wire connection box corresponding to a through hole by screw bolts, and the lamp base has a coupling section for accommodating the lamp rod. Upper and lower ends of the stairway-like edged lamp base respectively have symmetric coupling holes on the lateral sides of the lamp base, and a latch plate and a torque spring disposed on top of the latch plate pass through one pair of the symmetric coupling holes, such that the lamp rod can be inserted into the lamp base. After the lamp rod is inserted into the lamp base, the blocking groove at the top of the lamp rod presses against an engaging end of the latch plate, so that the lamp rod is secured onto the lamp base.

6 Claims, 8 Drawing Sheets

242
P1
241
1
2
311
31
3
21
11
23
20
P

242
P1
241
31
1
2
3
23
20
P
11

242
P1
241
31
1
2
3
23
20
P
11

2A
21
22A
22B
201

P1
P
21
2
242
24
241
22A
20
22B
23
11
311
31
3
1

LAMP ROD ASSEMBLY OF DETACHABLE CEILING LAMP

BACKGROUND OF THE INVENTION

1. Field of the Invention

The present invention relates to a lamp rod assembly of detachable ceiling lamp, more particularly to a do-it-yourself (DIY) lamp rod assembly of detachable ceiling lamp. The present invention comprises a lamp base fixed on a lateral side of a wire connection box, and a lamp rod inserted into the interior of the lamp base; wherein a lamp base is fixed in a position on the wire connection box corresponsive to a through hole by screw bolts, and the lamp base has a coupling section for accommodating the lamp rod, and the upper and lower ends of the stairway-like edged lamp base respectively have symmetric coupling holes each on the lateral sides of the lamp base, and a latch plate and a torque spring disposed on top of the latch plate pass through one pair of the symmetric coupling holes, such that the lamp rod can be inserted into the lamp base. After the lamp rod is inserted into the lamp base, the blocking groove at the top of the lamp rod presses against an engaging end of the latch plate, so that the lamp rod is secured onto the lamp base. The user just needs to insert the lamp rod into the lamp base to assemble the lamp, and thus accomplishing the function of DIY assembling.

2. Description of the Related Art

The conventional structure of inserting a conductive set of a lamp, regardless a wall lamp, a table lamp, or a floor lamp, uses screws and nuts for the fixing. However, this kind of assembly by screws and nuts may easily collide the finished goods during the assembling, and has to use working tools such as wrench and screwdriver for the fixing. The friction produced during the assembling may expose the electric wire easily and may even cause the hazard of electric shock. Therefore, the traditional way causes trouble for the assembling, and is definitely not suitable for DIY users to assemble the lamp by themselves. The manufacturers have to assemble the wire connection box with the lamp rod first before selling the lamp, which may increase the cost. In view of these shortcomings, the inventor of the present invention based on years of experience accumulated from the engagement in the related industry conducted extensive research to resolve the aforementioned shortcomings and invented the present invention.

SUMMARY OF THE INVENTION

The primary objective of this invention is to provide a lamp rod assembly of detachable ceiling lamp which comprises a lamp base fixed on a lateral side of a wire connection box, and a lamp rod inserted into the interior of the lamp base; wherein a lamp base is secured to a position on the wire connection box corresponsive to a through hole by screw bolts, and the lamp base has a coupling section for accommodating the lamp rod, and the upper and lower ends of the stairway-like edged lamp base respectively have symmetric coupling holes each on the lateral sides of the lamp base, and a latch plate and a torque spring disposed on top of the latch plate pass through one pair of the symmetric coupling holes, such that the lamp rod can be inserted into the lamp base. After the lamp rod is inserted into the lamp base, the blocking groove at the top of the lamp rod presses against an engaging end of the latch plate, so that the lamp rod is secured onto the lamp base. The user just needs to insert the lamp rod into the lamp base to assemble the lamp, and thus accomplishing the effect of facilitating users to assemble the lamp on their own.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figures 1, 1A:
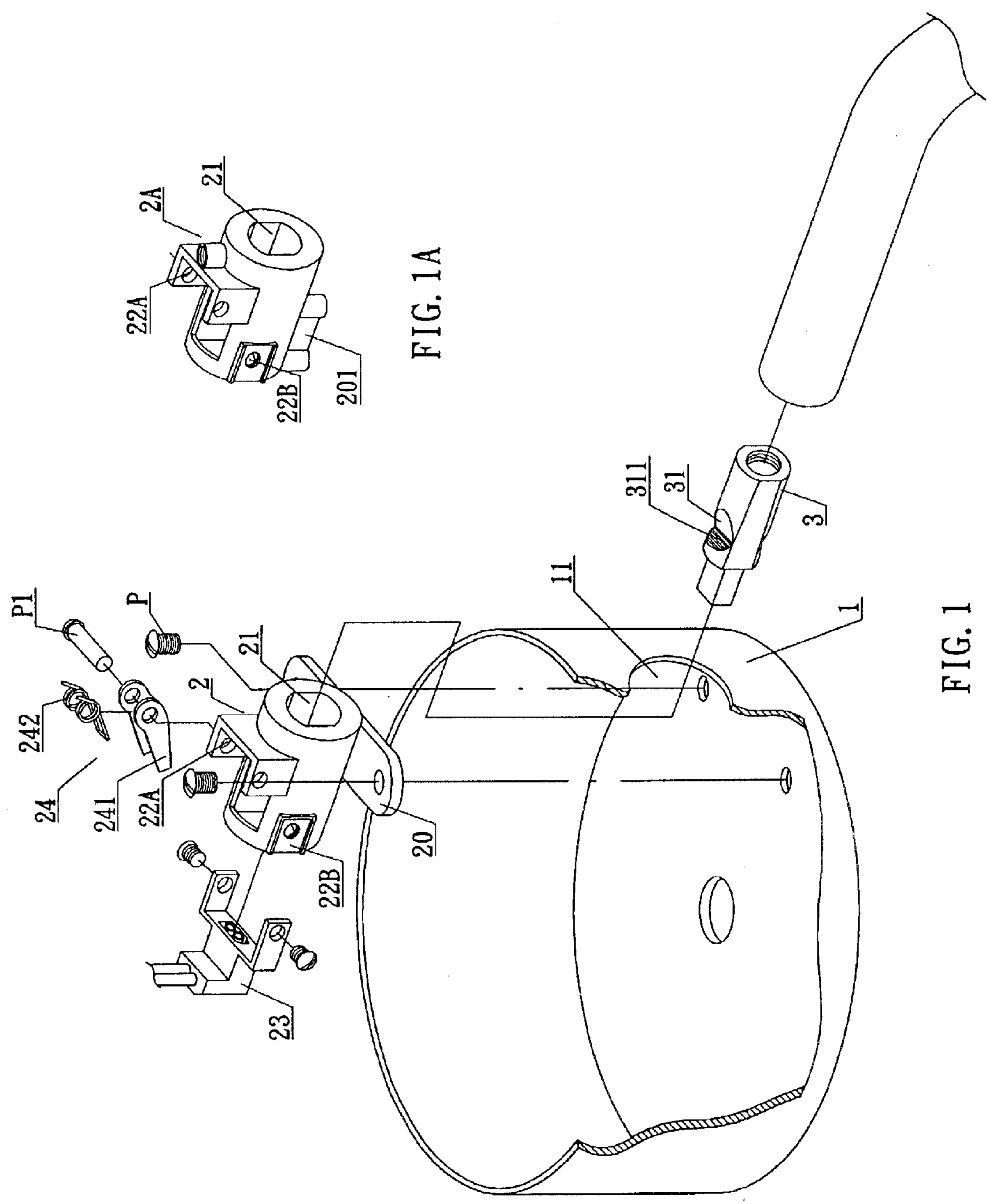
FIG. 1 is a perspective diagram of the disassembled parts of a preferred embodiment of the present invention.
FIG. 1A is an illustrative diagram of a lamp base of a first preferred embodiment of the present invention.

In the detailed description of the preferred embodiments, it should be noted that like elements are indicated by the same reference numerals throughout the disclosure.

Figure 1B:
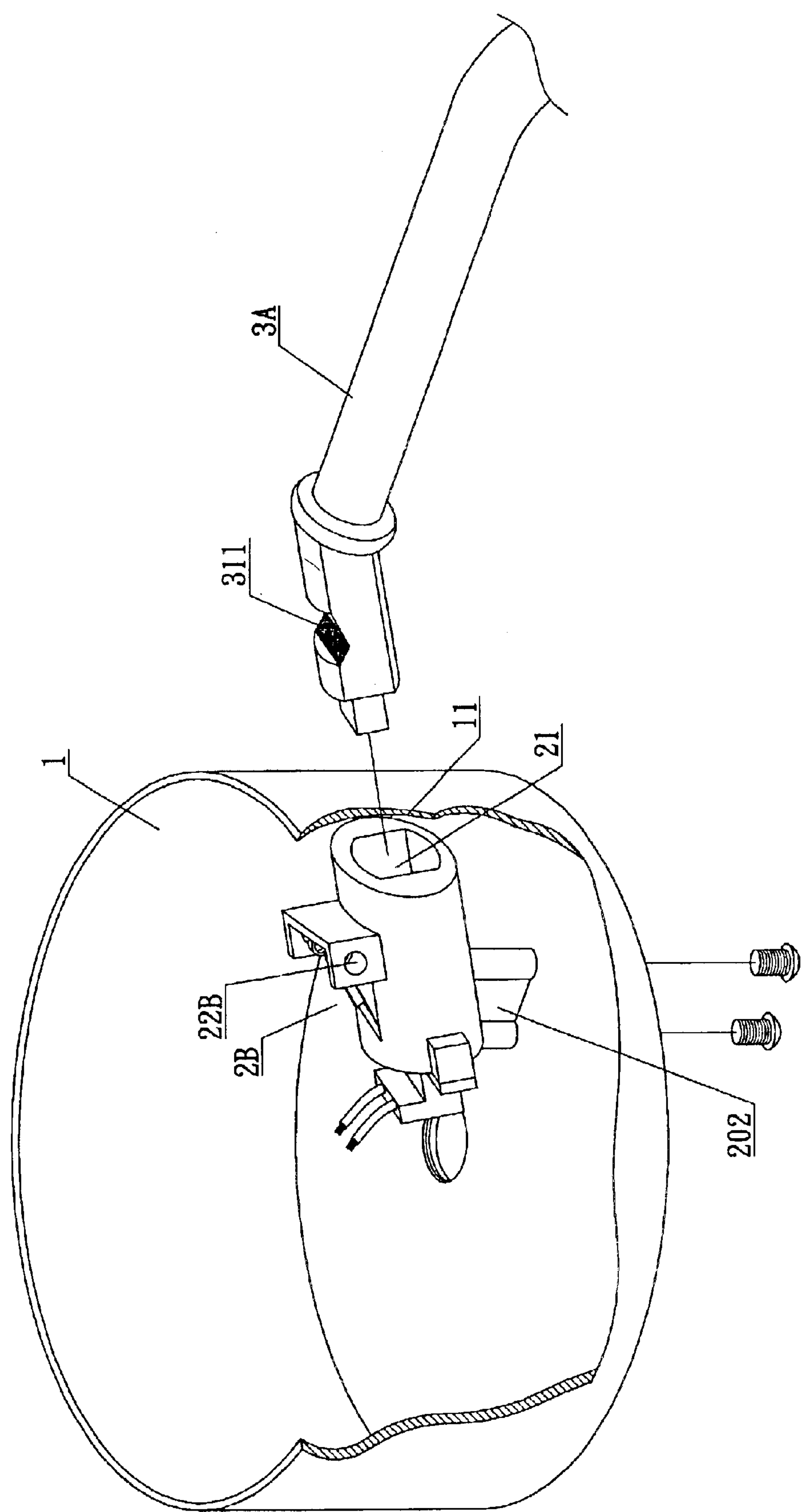
FIG. 1B is an illustrative diagram of a lamp base of a second preferred embodiment of the present invention.
Figure 2:
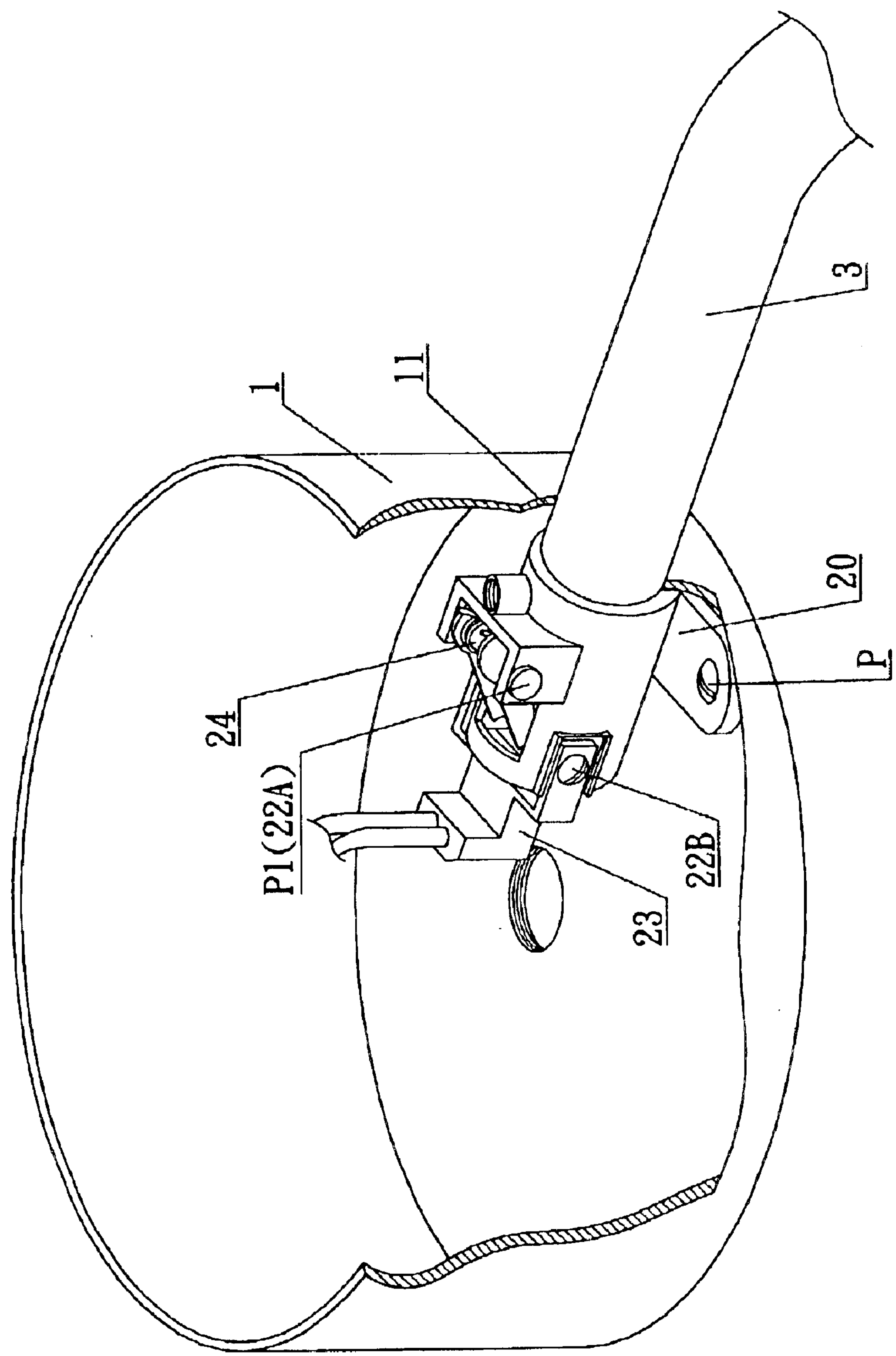
FIG. 2 is a perspective diagram of the assembled structure of a preferred embodiment of the present invention being used in a ceiling lamp.
Figure 3A:
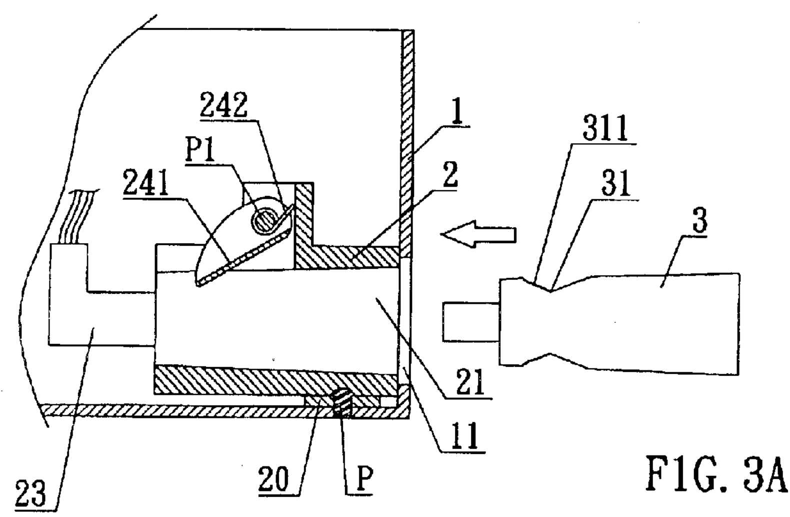
FIG. 3A is a cross-sectional diagram of a lamp rod of a preferred embodiment of the present invention before the lamp rod is inserted into the lamp base.
Figure 3B:
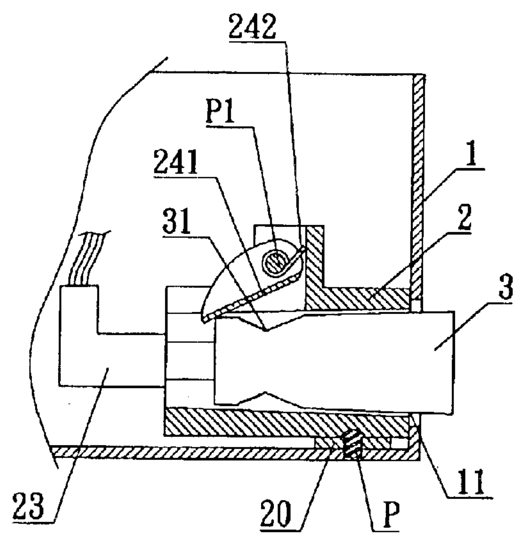
FIG. 3B is a cross-sectional diagram of a lamp rod of a preferred embodiment of the present invention while the lamp rod is inserted into the lamp base.
Figure 3C:
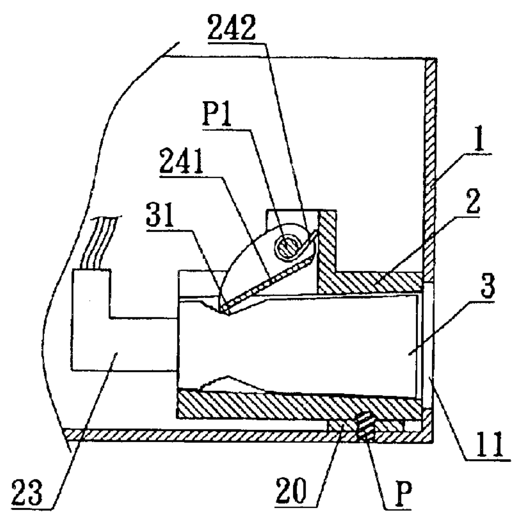
FIG. 3C is a cross-sectional diagram of a lamp rod of a preferred embodiment of the present invention after the lamp rod is inserted into the lamp base.
Figures 4, 4A:
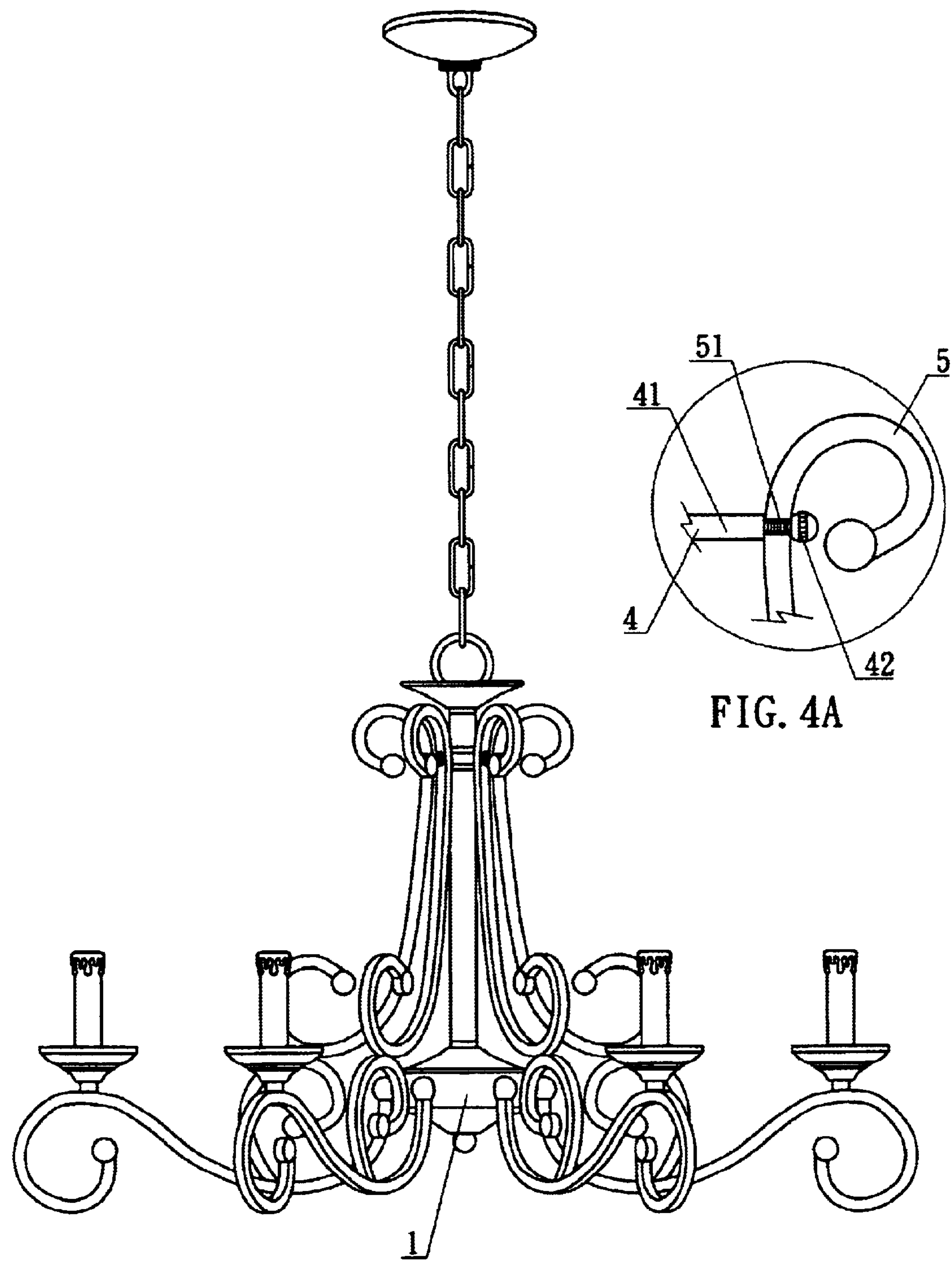
FIG. 4 is a diagram of a preferred embodiment of the present invention being applied to a transversally inserted ceiling lamp.
FIG. 4A is an enlarged diagram of the coupling position of the upper half section of the lamp rod and the hanging rod of the present invention.
Figure 5:
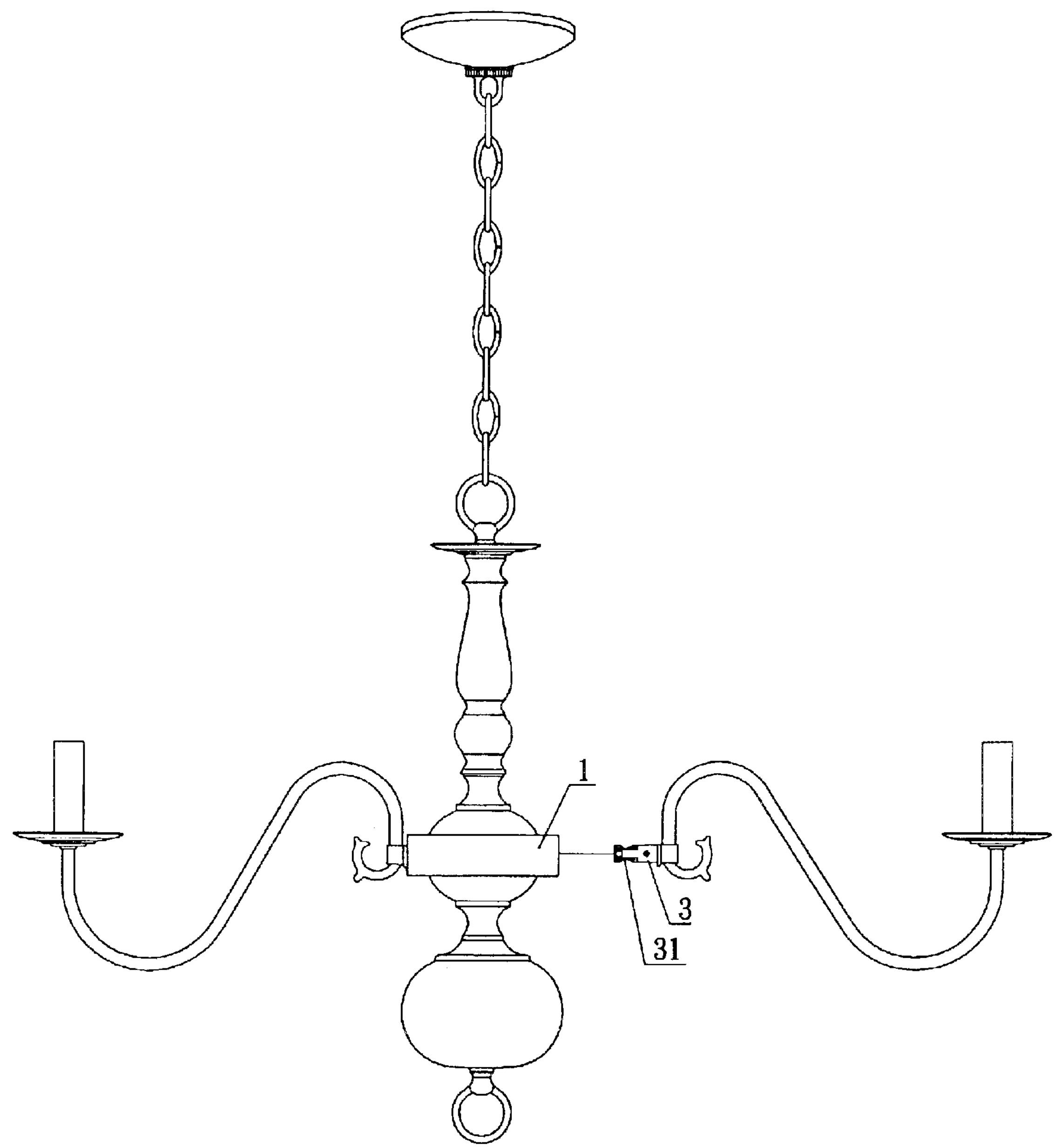
FIG. 5 is a diagram of another embodiment of the present invention.
Figures 6, 6A:
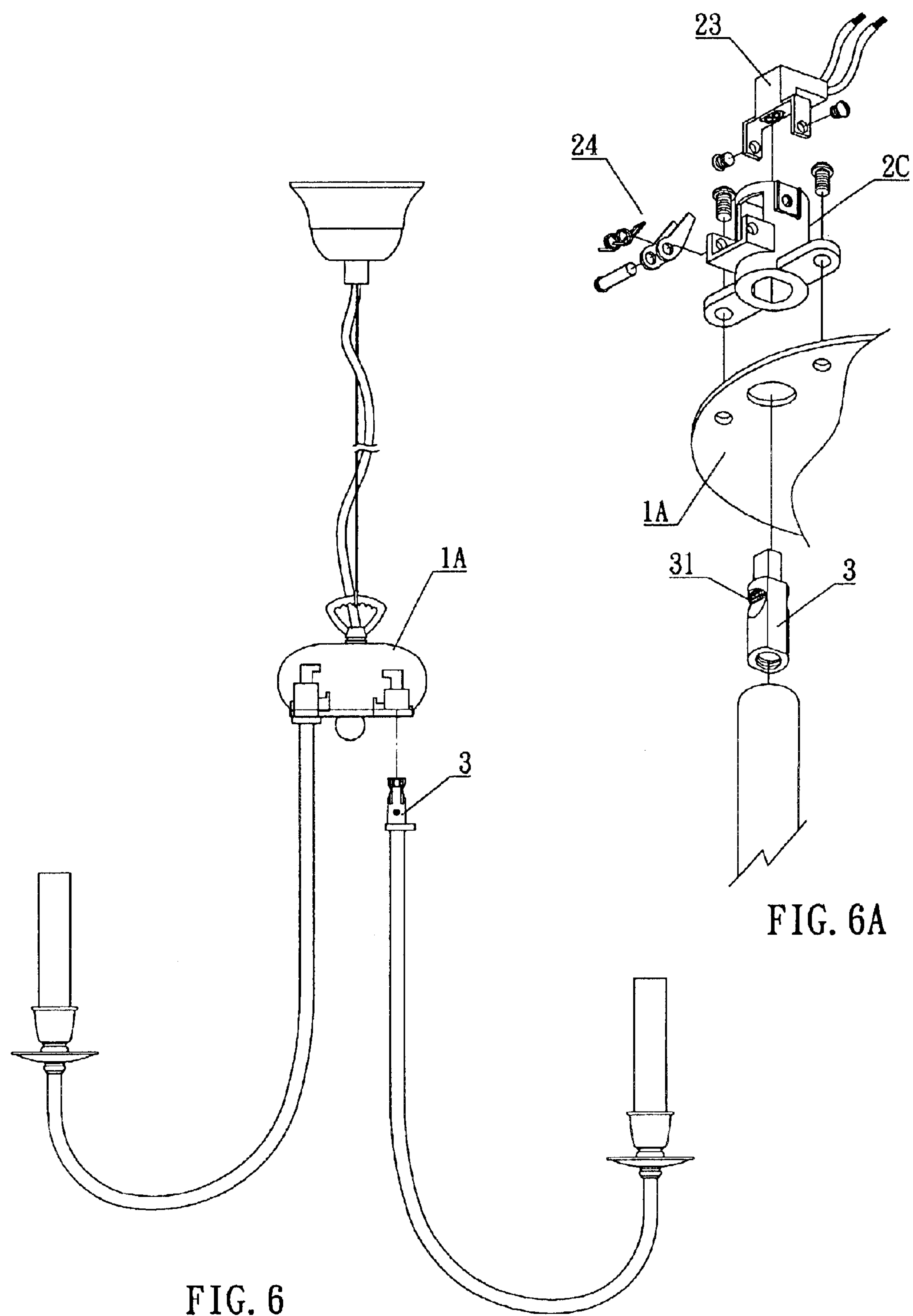
FIG. 6 is a diagram of the present invention being used in a vertical ceiling lamp.
FIG. 6A is an enlarged diagram of the assembled structure of the lamp base and the lamp rod.
Figure 7A:
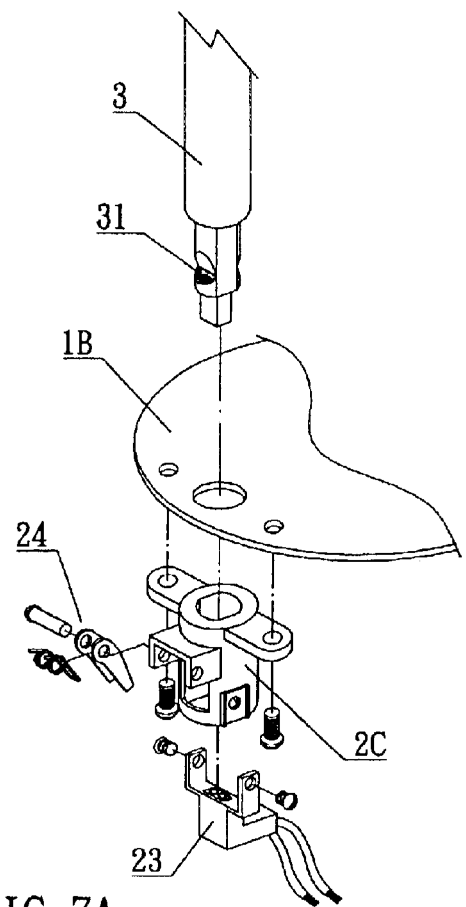
FIG. 7A is an enlarged diagram of the disassembled parts of the lamp base and lamp rod.
Figure 7:
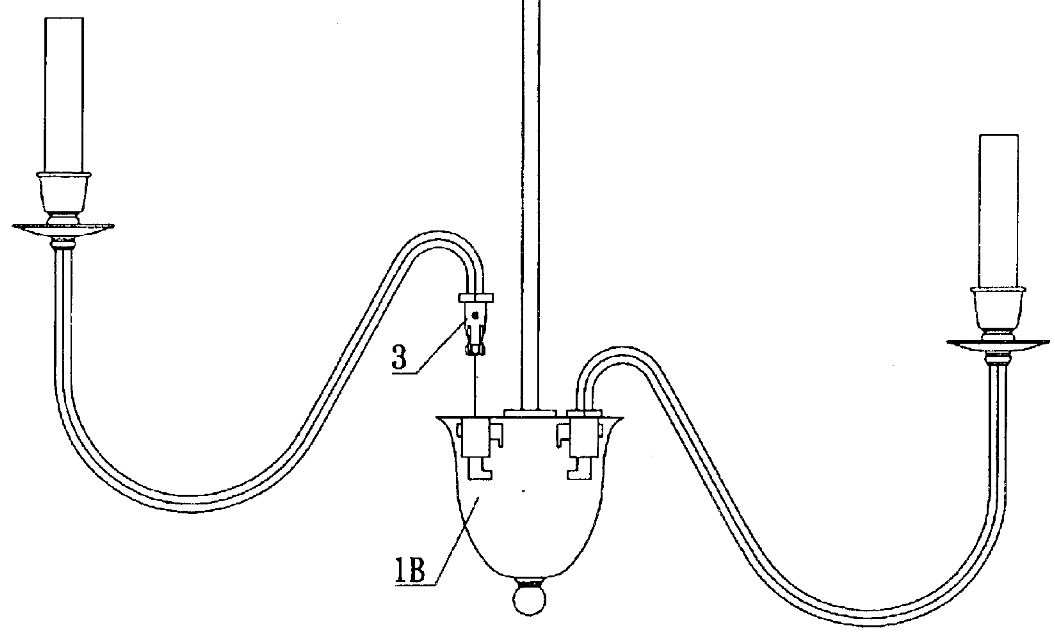
FIG. 7 is a diagram of another embodiment of the present invention being used in a vertical ceiling lamp.

Please refer to FIGS. 1 and 2 for the structure of the present invention comprising a lamp base 2 fixed on a lateral side of a wire connection box 1, and a lamp rod 3 inserted into the interior of the lamp base 2; wherein:

- a through hole 11 is disposed on the lateral side of the wire connection box 1, a lamp base 2 is secured to a position on the wire connection box 1 corresponsive to the through hole 11 by screw bolts P;
- a platform-like coupling base 20 is defined at the position where the lamp base is coupled with the wire connection box 1, and a pair of coupling holes 21 corresponsive to the through hole 11 of the wire connection box 1 are disposed on the lateral sides of the lamp base 2 for latching the lamp rod 3 after its insertion. The upper and lower sections of the ring-like surface of the lamp base 2 respectively have symmetric upper and lower coupling holes 22A, 22B, and the lower coupling hole 22B couples to an insertion base 23, and the insertion base exactly accommodate the connector of the lamp rod 3, and the upper coupling hole 22A secures a restricting member 24 by a wedge P1, of which such restricting member 24 uses the wedge P1 to pass through a latch plate 241 with a closed bottom and a torque spring 242 on top of the latch plate 241, and secures the latch plate 241 and the torque spring 242 into the coupling hole 22A of the lamp base 2;

referring to the FIGS. 1A and 1B, the bottom of the lamp base 2A also protrudes a cylindrical coupling base 201 (as shown in FIG. 1A) or a cylindrical coupling base 202 tilted upward towards the outside so that the entire lamp base 2B also tilts upward to latch the tilted lamp rod 3A (as shown in FIG. 1B) by means of the upwardly tilted coupling hole 21 of the lamp base 2B;

the rod body of the lamp rod 3 is tapered, and a cut indented blocking groove 31 is disposed on the lamp rod 3 at a position corresponsive to the restricting member 24 of the lamp base 2 for passing the lamp rod 3 from the coupling section 21 of the lamp base, and an end of the lamp rod 3 exactly presses against the latch plate 241 of the restricting member 24, and after the lamp rod 3 passes through, the restoring force of the torque spring 242 returns the latch plate 241 to the original position, and latches the latch plate 241 on the blocking groove 31; the blocking groove 31 has a serrated surface 311 at an end that latches the lamp base in advance, and appropriately hooked onto the restricting member 24 of the lamp base to prevent the entire ceiling lamp from falling down due to insufficient support; and the head section of the lamp rod after being inserted into the lamp base presses against the coupling base 23 of the lamp base 2 for the electric connection;

referring to FIG. 3, when the lamp rod 3 is inserted into the coupling section 21 of the lamp base, the connector of the lamp rod 2 exactly presses against and pushes the latch plate 241 of the restricting member outward, so that the closed end of the latch plate 241 presses the torque spring 242 accordingly, and twists to deform the torque spring 242 (as shown in FIG. 3B);

after the lamp rod is completely inserted, the latch plate 241 of the restricting member makes use of the restoring force of the torque spring 242 to return itself to the original position and to latch the latch plate 241 to the blocking groove 31 of the lamp rod 3 and fixes the lamp rod 3 onto the lamp base 1; at that time, the head of the lamp rod 3 exactly aligns with and inserts into the coupling base 23 of the lamp base 2 in order to electrically connect the lamp base 2 and the lamp rod 3 (as shown in FIG. 3C);

referring to FIGS. 4, 4A and 5, for the diagrams showing the overall condition of different ceiling lamps, in which the upper section of a hanging rod 4 at the top of the wire connection box 1 is coupled to an upper half section of a two-section lamp rod 5, and a coupling hole 51 is disposed on the lamp rod 5, and a coupling base 41 is disposed on the hanging rod 4 for securing a coupling hole 51 of the lamp rod 5 into the coupling base 41 of the hanging rod 4 by a bolt 42, such that the lamp rod 5 can be fixed onto the hanging rod 4 (as shown in FIG. 5);

referring to FIGS. 6 and 6A for the diagram of an embodiment of the lamp rod being installed upward, of which the wire connection box 1A at its bottom has a through hole 11, and the bottom of the lamp base 2C protrudes a coupling hole 21 from the through hole 11 of the wire connection box for inserting the lamp rod 3 into the coupling hole 21 of the lamp base, and the connector of the lamp rod 3 can exactly push the latch plate 241 of the restricting member outward, and twist to deform the torque spring 242 according; and after the lamp rod 3 is completely inserted, the restoring force of the torque spring 242 will return the spring into the original position, and the lamp rod 3 is fixed onto the lamp base 2;

referring to FIGS. 7 and 7A for the diagram of an embodiment of the lamp rod being installed downward, of which the wire connection box 1B at its top edge has a through hole 11, and the lamp base 2*c* is installed inside the top of the wire connection box 1 in the opposite direction, such that the coupling hole 21 can protrude out of the through hole 11 of the wire connection box for the inserting the lamp rod 3 downward inside the coupling hole 21.

In summation of the above description, the DIY lamp connecting structure of the present invention herein enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lamp rod assembly of detachable ceiling lamp, comprising: a lamp base fixed to a wire connection box and a lamp rod inserted into the lamp base; wherein:

said wire connection box having a through hole, and the lamp base being aligned with said through hole, and the lamp base having a coupling hole aligned with said through hole of the wire connection box for coupling the lamp rod; said lamp base having upper and lower symmetric coupling holes; and an insertion base being coupled to one of the lower coupling holes for coupling and engaging a connector of the lamp rod; the upper coupling holes of the lamp base being coupled to a restricting member by a wedge, and said restricting member using a wedge to pass through a close-bottom latch plate and a torque spring disposed on the latch plate to pivotally connect the latch plate and the torque spring into the coupling hole of the lamp base;

a body of said lamp rod being tapered, and having a cut indented blocking groove being disposed at the position where the lamp rod aligning the restricting member of the lamp base for pushing the latch plate of the restricting member outwardly when an end of the lamp rod is inserted therein and after the lamp rod being inserted into the lamp base the latch plate returning to its original position by the restoring force of the torque spring and the latch plate being latched in the blocking groove; the end of the lamp rod being inserted into the lamp base for the electrical connection after the end of the lamp rod being inserted into and pressed against the lamp base;

thereby allowing users to assemble the lamp on their own by just inserting the lamp rod into the lamp base for the application.

2. A lamp rod assembly of detachable ceiling lamp as claimed in claim 1, wherein said lamp base has a coupling base connected to the wire connection box.

3. A lamp rod assembly of detachable ceiling lamp as claimed in claim 1, wherein said blocking groove of the lamp rod having a serrated surface for latching the lamp base in advance, and being appropriately hooked onto the restricting member of the lamp base to prevent the whole ceiling lamp under the lamp rod from falling off due to insufficient support.

4. A lamp rod assembly of detachable ceiling lamp as claimed in claim 1, wherein said coupling section of the wire connection box is substantially a rectangular hole structure.

5. A lamp rod assembly of detachable ceiling lamp as claimed in claim 1, wherein said wire connection box at its bottom having a through hole, and a coupling section is exactly protruded from the bottom of the lamp base for inserting the lamp rod upward into the coupling hole of the lamp base.

6. A lamp rod assembly of detachable ceiling lamp as claimed in claim 1, wherein said wire connection box at its top having a through hole, and the lamp base is installed inside the top of the wire connection box in the opposite direction, and a coupling section protrudes from the through hole of the wire connection box for Inserting the lamp rod downward into the coupling hole of the lamp base.

* * * * *